United States Patent [19]

Nickles et al.

[11] 3,978,337
[45] Aug. 31, 1976

[54] THREE-DIMENSIONAL TIME-OF-FLIGHT GAMMA CAMERA SYSTEM

[75] Inventors: Robert J. Nickles, Madison, Wis.; Hans O. Meyer, Basel, Switzerland

[73] Assignee: Wisconsin Alumni Research Foundation, Madison, Wis.

[22] Filed: Jan. 29, 1975

[21] Appl. No.: 544,883

[52] U.S. Cl. .............................. 250/367; 250/363 R
[51] Int. Cl.² ......................................... G01T 1/20
[58] Field of Search ............ 250/367, 363, 366, 370

[56] References Cited
UNITED STATES PATENTS

| | | | |
|---|---|---|---|
| 2,879,398 | 3/1959 | Garrison | 250/366 |
| 3,502,873 | 3/1970 | Woronowicz | 250/363 |
| 3,688,113 | 8/1972 | Miraldi | 250/370 |

*Primary Examiner*—Harold A. Dixon
*Attorney, Agent, or Firm*—Burmeister, York, Palmatier, Hamby & Jones

[57] ABSTRACT

A pair of fast acting elongated plastic scintillation bars are arranged in a skewed spatial relationship to thereby define a unique tetrahedron in space which constitutes the positron sensitive volume of the camera. Each scintillation bar is serviced by a pair of fast acting photomultiplier tubes disposed immediately adjacent the ends of the bars, so that four substantially coincident relative times of activation of the photomultipliers occur when the two opposed 511 keV gamma rays, arising from a positron annihilation within the tetrahedron, happen to hit and be stopped by the two scintillation bars, causing scintillations therein.

From measurements and analysis of the various time differences of photomultiplier activations, the location of the respective scintillations along the two bars is defined, thereby defining the gamma ray flight line joining the two scintillations. Measurement and analysis of various time differences of photomultiplier activations then serves to define the point along the gamma ray flight line at which the positron annihilation occurred.

In an enhanced sensitivity version, a plurality (p) of pairs of skewed detectors are arranged so that a plurality of detectors are parallel and closely spaced, and the plurality of detectors with which they are paired are also parallel and closely spaced, effectively forming ($p^2$) cameras covering ($p^2$) tetrahedrons, which tetrahedrons may be so closely overlapping as to cover almost identical volumes.

17 Claims, 9 Drawing Figures

C = ALGEBRAIC DIFFERENCE IN GAMMA FLIGHT PATHS = PB' − PA'

THREE-DIMENSIONAL TIME-OF-FLIGHT GAMMA CAMERA SYSTEM

The invention described herein was made in the course of work under a grant or award from the Department of Health, Education, and Welfare.

BACKGROUND OF THE INVENTION

The invention relates to radiological cameras and systems, and particularly, to a stationary radiological camera having the capability of total isolation of positron producing events, such as the decay of certain radioisotopes.

The generation of distribution maps of radioactive materials, generally gamma emitting radioisotopes, within a patient has become a very important aspect of nuclear medicine.

A variety of cameras which are capable of producing excellent two-dimensional maps have been developed. The rectilinear scanner described by B. Cassen, L. Curtis and R. Libby, in the 1951 Volume of Nucleonics, at p. 46, uses a single collimated NaI crystal which mechanically traverses the area of interest over a patient while a count rate is generated and recorded in spatial synchrony. M. A. Bender and M. Blau have described, in the 1963 volume of Nucleonics, at p. 52 the auto fluoroscope which consists of a fixed rectangular array of discrete NaI crystals. The widely used Anger camera, H. W. Anger, Review of Scientific Instruments Vol. 29 (1958), p. 27, employs a large continuous disc of NaI which is then viewed by a dense array of photomultipliers tubes. The (x, y) coordinates of a gamma detection event in the scintillator are formed as a continuous function of the photomultiplier tubes outputs by weighted summation.

Stationary detector system, such as the Anger camera, are especially favored in applications where it is desired to image rapidly changing tracer concentrations because of their ability to spatially analyze events at high frame rates, uncompromised by the time limits imposed by a scanning process.

All of the above systems are severely limited in depth resolution. One approach to obtaining depth information is the use of a focused collimator, but, as in all systems relying on focusing, fixed focal lengths and depth of focus limit the utility. Other approaches to such tomographic imaging and improvements thereof are reviewed by G. S. Freeman "Tomographic Imaging in Nuclear Medicine", Society of Nuclear Medicine, Inc. New York, 1973. In general, it may be stated that there is a widespread clinical appreciation of the need for better depth resolution and the price that must be paid for it in terms of increased instrument complexity, imaging time, etc.

To our knowledge, only two instruments have been studied with the aim of obtaining true visualization of depth through total isolation of any desired section. In one of these a dual camera system viewing the cascade emissions of radionuclides, such as $^{75}$Se, has utilized conventional counting and coincidence counting at 90° to record three dimensional activity distributions. This instrument is disclosed by W. G. Monahan and M. D. Powell in "Three Dimensional Imaging of Radionuclides Distributions by Gamma Coincidence Detection", in the aforesaid *Tomographic Imaging in Nuclear Medicine*.

In the second instrument, described by C. Burnham, S. Aronow and G. L. Brownell, in "New Instrumentation for Position Scanning", presented at the International Conference on Radioisotopes in Localization of Tumors, England, Sept. 25–27, 1967, a different approach involved the one-dimensional depth measurement of a positron source on a line between two probes by directly observing the time-of-flight of the two 511 keV gammas resulting from the annihilation of the positron. They were able to resolve the position of the positron source to within 12 cm. (FWHM) along the line between the probes. We have, in effect, reproduced their experiment utilizing currently available fast acting scintillators and timing circuitry and obtained a resolution of about 4.5 cm.

We have combined this just described approach with a novel one dimensional system we have developed for locating a scintillation occurring along the length of a scintillator bar by a time-of-flight technique. And we have, in effect, put these two instruments together, — the prior art instrument capable of locating a positron annihilation event in one dimension, and our new instrument capable of locating the point of scintillation along the length of a scintillator bar, in a unique spatial arrangement such as to define a unique tetrahedron shaped volume within which the overall camera is sensitive to, and is able to uniquely locate the position of, positron emitting radionuclides.

The result is a novel three dimensional stationary camera having the capability of totally isolating the positron annihilation event which occurs almost immediately after a positron emitting radioisotope emits a positron.

Positron radiography has many special uses and advantages for certain purposes, these being fully reviewed in the aforementioned Burnham et al article.

Accordingly, it is one object of our invention to provide a novel apparatus and method for locating a scintillation point along an elongated scintillator bar.

The ultimate object of our invention is to provide a stationary three-dimensional camera system capable of total laminographic isolation of a positron producing radioactive source within a patient.

In brief, we accomplish the above object by exploiting an unorthodox tetrahedronal geometry, wherein a pair of skewed scintillator bars define a unique tetrahedron camera sensitive volume. Photomultiplier tubes are disposed at each end of both bars similar to the physical arrangement shown in FIG. 1 of the U.S. Pat. No. 3,688,113, Tomographic Radiation Sensitive Device, issued Aug. 29, 1972 to Miraldi. The four photomultipliers generate four fast timing pulses which can be processed to uniquely determine the location of the positron annihilation through time-of-flight and coincidence techniques.

We have thus invented a three-dimensional positron camera which departs from previous stationary approaches in its simplicity — subtending a large field of view with only two detector and four photomultiplier tubes. We have also conceived and described below means for increasing the sensitivity of our camera by the square of the number of pairs of scintillating bars employed.

DESCRIPTION OF THE DRAWINGS

Arrows are used throughout the above figures to indicate the direction of flow of information or pulses, or to indicate the positive direction in a positive-negative coordinate system, as will be obvious in each case.

DETAILED DESCRIPTION

Figure 1:
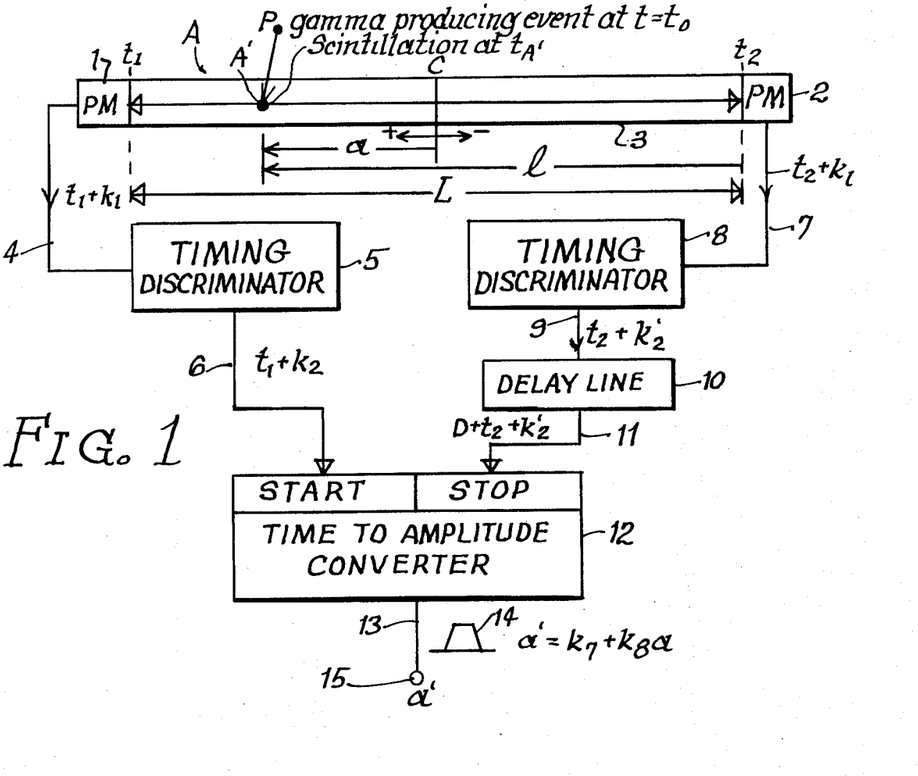
FIG. 1 is a schematic and block diagram of a somewhat simplistic form of the basic one-dimensional subcombination invention, this FIG. 1 being useful primarily in explaining certain basic principles of the invention.

Referring now to FIG. 1, a gamma detector indicated generally at A, consists of a uniform elongated fast acting cylindrical scintillator bar 3 and a pair of identical fast response photomultipliers 1 and 2 adjacent the left-hand and right-hand ends, respectively, of scintillator bar 3.

It will be assumed that a gamma ray producing event, such as for example, the radioactive decay of a gamma producing source, or the annihilation of a positron, from a positron producing source, occurs at point (P) at some arbitrary zero time ($t_0$), and that the resulting gamma ray happens to intersect the scintillator bar 3 and happens to cause a scintillation therein at point (A') at time ($t_A'$). A number of organic plastic scintillators are now commercially available which are capable of releasing the light energy in a very short period of time, — a few nanoseconds.

The resulting light photons travel along the scintillator bar 3 in both directions in a very complex and random manner depending upon the light reflecting properties of its cylindrical surface, as will hereinafter be treated in greater detail in connection with FIG. 5. The light energy travelling to the left is shown as arriving at photomultiplier tube 1 at time ($t_1$) and the light energy travelling to the right is shown as arriving at photomultiplier tube 2 at time ($t_2$). The scintillator bar 3 is shown as having a length (L).

Fast response photomultiplier tube 1 produces, at time ($t_1+k_1$), an output pulse proportional to the amount of visible light it receives, and it transmits this pulse, by way of line 4, to a timing discriminator 5 which, functions in a conventional manner to produce on its output line 6 a standard fast negative logic timing at a constant fixed time after receipt of an input pulse greater than the threshold value at which the discriminator has been set. The time at which this timing pulse appears on line 6 will be designated ($t_1 + k_2$).

In an identical manner, fast acting photomultiplier tube 2 produces at time ($t_2 + k_1$) an output pulse proportional to the amount of light it has received and transmits this pulse, by way of line 7, to timing discriminator 8 identical to timing descriminator 5. A standard fast negative logic timing pulse is thus produced at time ($t_2 + k_2'$) on the output line 9 of the timing descriminator 8, again provided, of course, that the pulse input is above the set threshold value. The threshold value at which the discriminators 5 and 8 are set might depend upon the energy of the particular gammas originally produced at point P, but in any event, would be high enough to eliminate pulses on lines 4 and 7 due to noise, background, and the like.

The pulse on line 9 is delayed by a time interval, which we shall designate "D", by the delay line 10 such that a timing pulse appears on output line 11 at time (D + $t_2 + k_2'$). This pulse is fed as the "stop" pulse to a time-to-amplitude converter 12 which functions in a conventional manner to produce on its output line 13 an output pulse having an amplitude proportional to the time interval between its input "start" pulse and its subsequent input "stop" pulse, provided, of course, the "start" and "stop" pulses are "coincident", i.e., within the selected time range of coincidence for which the time-to-amplitude converter is set.

The standard negative logic timing pulse appearing on line 6 is fed to the time-to-amplitude converter 12 as its "start" pulse. Accordingly, the amplitude ($a'$) of the output pulse 14 which appears on output line 13, and at output terminal 15 of the time-to-amplitude, converter, is proportional to the time interval (D+ $t_2 - t_1 + k_2 - k_2$). We may therefore express the amplitude $a'$ of the output pulse 14 as follows:

(1) $a' = k_4 (D + t_2 - t_1 + k_2 - k_2)$ $k_4$ being the proportionality constant associated with the time-to-amplitude converter 12.

In the illustrated example, it is apparent that the light photons from the scintillation at point (A') will arrive at the nearer photomultiplier tube 1 before they arrive at the more remote photomultiplier tube 2. In other words time ($t_2$) is later than time ($t_1$), or in still other words ($t_2$) has a higher absolute value, in nanoseconds, for example, than ($t_1$). It follows that in the illustrated example, the algebraic quantity ($t_2 - t_1$) has a positive value. However, the algebraic quantity ($t_2 - t_1$) would be negative if the scintillation occurred near photomultiplier tube 2.

By its very nature, the time-to-amplitude converter 12 requires for operability that the "start" pulse must be earlier in point of time than the "stop" pulse. Since ($t_1 + k_2$) is used as the "start" pulse in our illustrated example, and ($t_1 + k_2$) could be later in point of time than ($t_2 + k_2$), the delay (D) introduced by the delay line 9 is necessary in order to assure that the "start" pulse for the time-to-amplitude converter occurs earlier than the "stop" pulse, no matter where the scintillation takes place along the scintillation bar 3. In order for the "stop" pulse to be no later in point of time than the "start" pulse, the delay (D) must be at least equal to the time which would be required for the scintillation light energy to traverse the entire length (L) of the scintillator bar. For example, if the length (L) of the scintillator were 60 cm. and the effective velocity of the scintillation light through the bar were 20 cm. per nanosecond, then the delay time (D) which would have to be introduced would be at least 3 nanoseconds.

Actually, a considerably greater delay time (D) than the necessary minimum is introduced, say 15 to 20 nanoseconds, because the time-to-amplitude converter operates best when the interval between its "start" and "stop" pulses is in or near this range. Thus, in practice, that part of the output voltage ($a'$) of Equation (1) which represents the quantity ($t_2 - t_1$) is small compared to the part which represents the delay (D).

It has heretofore been stated that the light photons from the scintillation point at A' travels to the photomultipliers in a highly complex and random manner which depends upon the reflecting properties of the particular surface of the cylindrical scintillation bar 3. We have discovered that we can, nevertheless, operate on the principle that the time required for scintillation light photons to travel from the point of scintillation to either one of the photomultipliers and cause it to respond is directly proportional to the distance from the point of scintillation to the photomultiplier, resolution still obtain satisfactory spatial resolutions. In other words, we can, within limits which achieve results satisfactory for our purposes, assume that the scintillation light energy travels along the scintillator bar at all points along it at a constant effective velocity, (approximately 20 cm. per nanosecond) for the fast plastic scintillator bars which we employ. Within certain acceptable limits, therefore, we can directly relate times of travel to distances travelled in FIG. 1, and we can state that the output pulse 14 which appears at terminal 15 of FIG. 1 contains, by way of its amplitude, the information as to those distances. For best resolutions, we use identical matched fast acting photomultipliers 1 and 2 and identical matched timing discriminators 5 and 8 and we match the total length of electrical line between photomultiplier 1 and the time-to-amplitude converter 12 with that between photomultiplier 2 and the time-to-amplitude converter 12 and we keep these lengths as low as possible.

Referring back to the detector A, itself, for the purpose of mathematical treatment and understanding, a variable algebraic distance (coordinate) (a) has been defined as the distance from the midpoint of the scintillator bar 3 to the variable scintillation point A', the quantity (a) being positive under the exemplified circumstance where the scintillation is to the left of the midpoint, and negative when the scintillation is to the right of the midpoint. An always positive varible distance (l) has also been defined as the distance from the right end of the scintillator bar 3 to the variable scintillation point A'. It is apparent that the following algebraic equation holds:

$$(2) \quad l = L/2 + a$$

Since the scintillation may take place anywhere along the length of the scintillator bar 3, it is evident that (a) can vary from $+L/2$ to $-L/2$ and that (l) can vary from zero to L.

It can readily be seen that (a) is equal to one half the difference between the distance from point (A') to the right end of the scintillator bar 3 and the distance from point (A') to the left end of the scintillator bar 3. For example, if point (A') were at the extreme left end of the scintillator bar, (a) would equal $L - 0/2 = +L/2$. If point (A') were at the midpoint of the scintillator bar (a) would equal $L/2 - L/2 = 0$. If point (A') were at the extreme right end of the scintillator bar, (a) would equal $0 - L/2 = -L/2$. The corresponding values of (l) in the same order would be $l = L$; $l = L/2$; and $l = 0$, as is evident, or as can be calculated from Equation (2).

Since the scintillation light energy starts out toward the opposing photomultipliers at the same time ($t_A'$), and since our previously referred to assumption states that it travels at a constant equal effective velocity in both directions, it follows that:

$$(3) \quad a = k_5 (t_2 - t_1) = k_6 (t_2 - t_1)$$

the proportionality constant $k_5$ being the previously stated effective velocity of the light energy along the scintillator bar 3, i.e. approximately 20 cm. per nanosecond, and the proportionality constant $k_6$ being $20/2 = 10$.

Substituting for ($t_2 - t_1$) in Equation (1), $$(4) \quad a' = k_4 (D + k'_2 - k_2) + k_4 \, a/k_6$$

There is thus established a linear relationship between the amplitude ($a'$) of output pulse 14 and the coordinate (a) wherein the first term ($k_7$) is a positive constant and the second term ($k_8 a$) is a variable, and is positive or negative corresponding to whether ($t_2 - t_1$) is positive or negative, and the first term ($k_7$) is necessarily greater in magnitude than that of the second term ($k_8 a$) so that the value ($a'$) is necessarily positive. Since the actual values of all constants are either known or readily obtainable, either by calculation or calibration, and the actual amplitude of voltage pulse ($a'$) can be measured, the value and sign (direction) of the coordinate (a) in FIG. 1 could be actually obtained by pencil and paper mathematics, if desired, thus locating the point (A') of the scintillation along the bar 3. The distance (l) from the right end of the scintillator bar to the scintillation point (A') could thus also be obtained, if desired, from equation (2).

Figure 2:
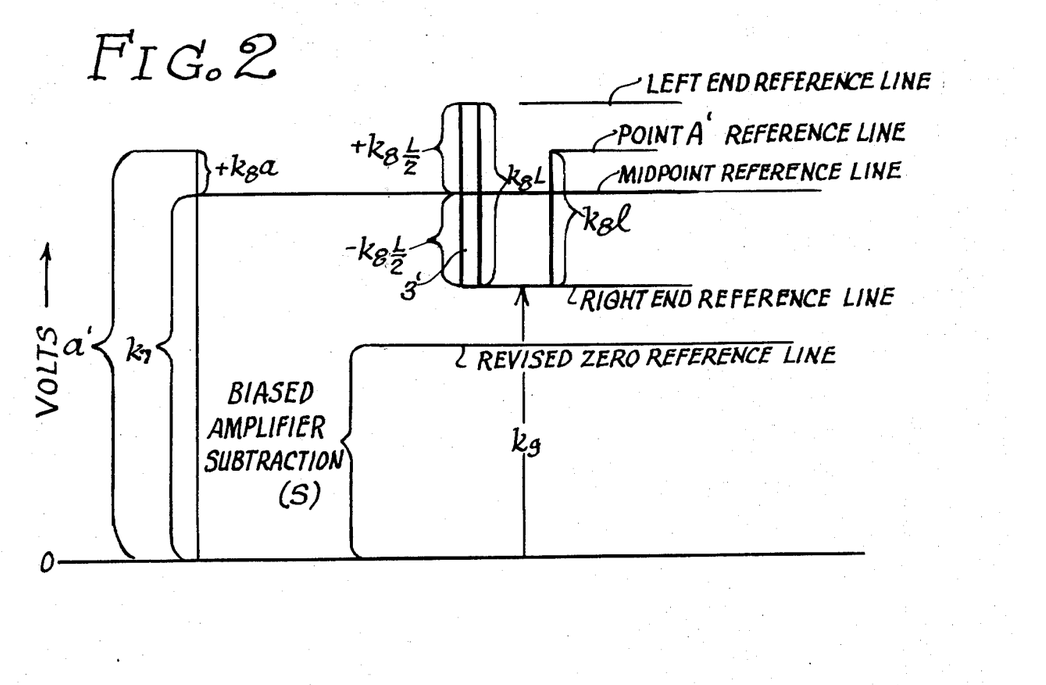
FIG. 2 is a diagrammatic breakdown of the components of the output voltage signal of FIG. 1.

The voltage-position relationships referred to above, particularly in Equation (4), are graphically illustrated in FIG. 2. The voltage ($a'$) can only be positive and it consists of a positive constant voltage ($k_7$), which corresponds to the midpoint of the scintillator bar 3 and a positive or negative variable voltage ($k_8 a$) which is proportional in magnitude to the distance from the midpoint to the scintillation point (A') and is positive if the scintillation is to the left of the midpoint and negative if the scintillation is to the right of the midpoint. The particular value of ($k_8 a$) shown in FIG. 2 corresponds to the illustrative example of FIG. 1 wherein the scintillation point (A') is about halfway between the midpoint of the scintillator bar 3 and its left end. The maximum possible magnitude of ($k_8 a$) is ($k_8 L/2$), and positive and negative values of ($K_8 L/2$) are shown extending in upper and lower directions, respectively, from the midpoint voltage value ($k_7$), thereby establishing a voltage difference ($k_8 L$), identified by reference numeral 3', which corresponds to and is proportional to the length of the scintillator bar 3. The left end of the scintillator is represented by the voltage ($k_7 + k_8 L/2$) and the right end of the scintillator bar 3 is represented by the voltage ($k_7 - K_8 L/2$), which voltage is also the "zero l" reference line for the distance (l). Thus, the scintillation of our illustrative example is shown as ($k_8 l$) upward from the right end or "zero l" reference line.

Thus, it is apparent that the amount by which the amplitude of the output voltage signal ($a'$) exceeds the voltage corresponding to the right end (zero l) reference line is directly proportional to the distance (l) of FIG. 1. This can also be seen by substituting the value $a = 1 - L/2$ (from Equation (2) ), in Equation (4) :

(5) $a' = k_7 + k_8 (1-l/2) = k_7 - k_8L/2 + k_8l = k_9 + k_8l$ wherein all terms in Equation (5) are necessarily positive quantities. From Equation (5), it follows that the right end reference line (the zero l reference line) is at the voltage $k_9$, and this has been shown in FIG. 2.

Figure 3:
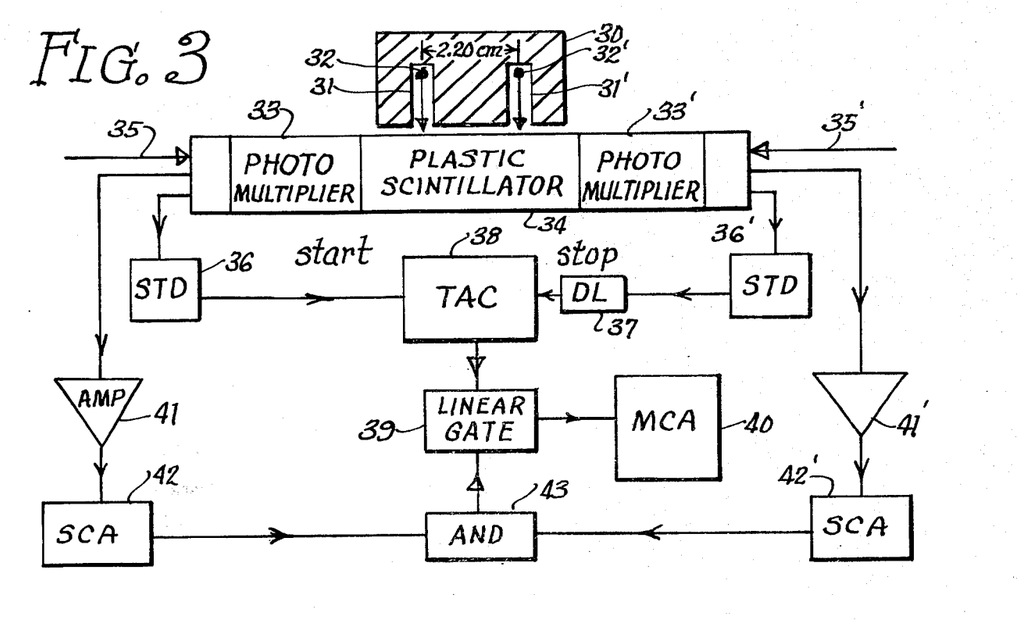
FIG. 3 is a schematic and block diagram of an actual test setup of the one-dimensional invention of FIG. 1 utilizing preferred electronic circuitry and components.

Referring now to FIG. 3, the linear position sensitive gamma detector there shown was built and tested in order to check the feasibility and resolution of the invention of FIG. 1 utilizing sophisticated electronic techniques and components. In FIG. 3 reference numeral 30 designates a lead-block having two parallel downwardly directed channels 31, 31' which serve as collimators for gamma ray sources 32, 32' ($^{60}$Co) disposed 2.2 cm. apart in the respective upper closed ends of channels 31, 31'. The $^{60}$Co source emits gammas having energies of 1333 keV and 1173 keV.

As indicated by the arrows in channels 31, 31', a portion of the gamma photons strike a plastic cylindrical scintillator 34 at points 2.2 cm. apart and react with nuclei therein to produce scintillations therein. In this case, a Nuclear Enterprises, Pilot Divison, Model NE 102A 2by 2 inch plastic scintillator 34 was used.

Two photomultipliers 33, 33' which in this case were Amperek Model XP-1021 photomultipliers, were disposed at opposing ends of the scintillator 34. The arrows 35, 35' merely denote the incoming high voltage leads for the photomultipliers.

The fast timing electronics is substantially identical to that of FIG. 1 down as far as the time-to-amplitude convertor 38, which in this case, was an ORTEC Model 447. The timing discriminators 36, 36' were ORTEC Model 457 Constant Fraction Timing Discriminators, and the delay line 37 was conventional. The photomultiplier pulses used to trigger the discriminators were negative pulses obtained from the final anodes of the photomultipliers.

In contrast to FIG. 1, the output pulse from the time-to-amplitude converter 38 was fed to a conventional linear gate 39, the output of which, in turn, was fed to a conventional multichannel analyzer 40.

In contrast to FIG. 1, the output pulse from the time-to-amplitude converter 38 was fed to a conventional linear gate 39, the output of which, in turn, was fed to a conventional multichannel analyzer 40.

In the case of FIG. 3, the fast electronic circuitry is supplemented by a slow electronics system, thereby freeing the fast electronics modules from various gating and threshhold burdens. Briefly, positive signals from the next to last dynodes of photomultipliers 33, 33' are amplified in amplifiers 41, 41', respectively, and then interrogated by conventional single channel analyzers 42, 42', the gates for which are set at voltages corresponding to an energy range between 200 and 550 keV. The single channel analyzers also serve to eliminate pulses which may arise merely from noise in the tubes or circuitry. If the amplitudes of the pulse inputs to the single channel analyzers 42, 42' correspond with the gate settings of these two analyzers logic signals are generated and sent to the AND circuit 43. The receipt of these two pulses by the AND circuit permits it to transmit an enabling logic pulse to linear gate 39, with the result that the amplitude of the output pulses from the time-to-amplitude converter 38 (corresponding to pulses 14 of FIG. 1) can be analyzed in the multichannel analyzer 40 and a record made thereof.

Figure 4:
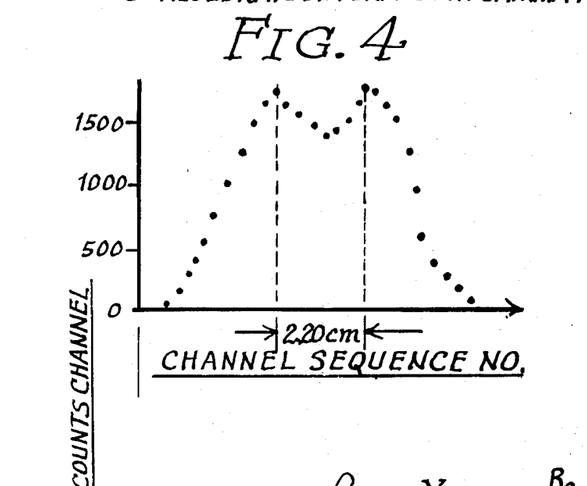
FIG. 4 is a curve showing actual test results obtained with the FIG. 3 equipment in terms of counting rate versus distance along the single dimension.

FIG. 4 is an actual plot of counts per channel versus channel sequence number obtained in the actual experimental equipment of FIG. 3. As can be seen, the plot, by its two peaks, does indicate the 2.2 cm. separation of scintillations along the axial dimension of the scintillator. Upon analysis, the data of FIG. 4 shows that a full width half maximum (FWHM) resolution of about 2.4 cm. in the linear position of the scintillation event can be obtained with the FIG. 3 equipment and circuitry.

Obviously, the experimental setup of FIG. 3 could readily be adapted to diagnostic use. For example, the two sources 32, 32' and the two channels 31, 31' could be eliminated, and the leadblock 30 could have a single slot milled therein to form a single collimator which could scan the patient a line at a time along the length of the plastic scintillator 34. The plastic scintillator could then be moved normal to its axis slightly and the procedure repeated.

Figure 5:
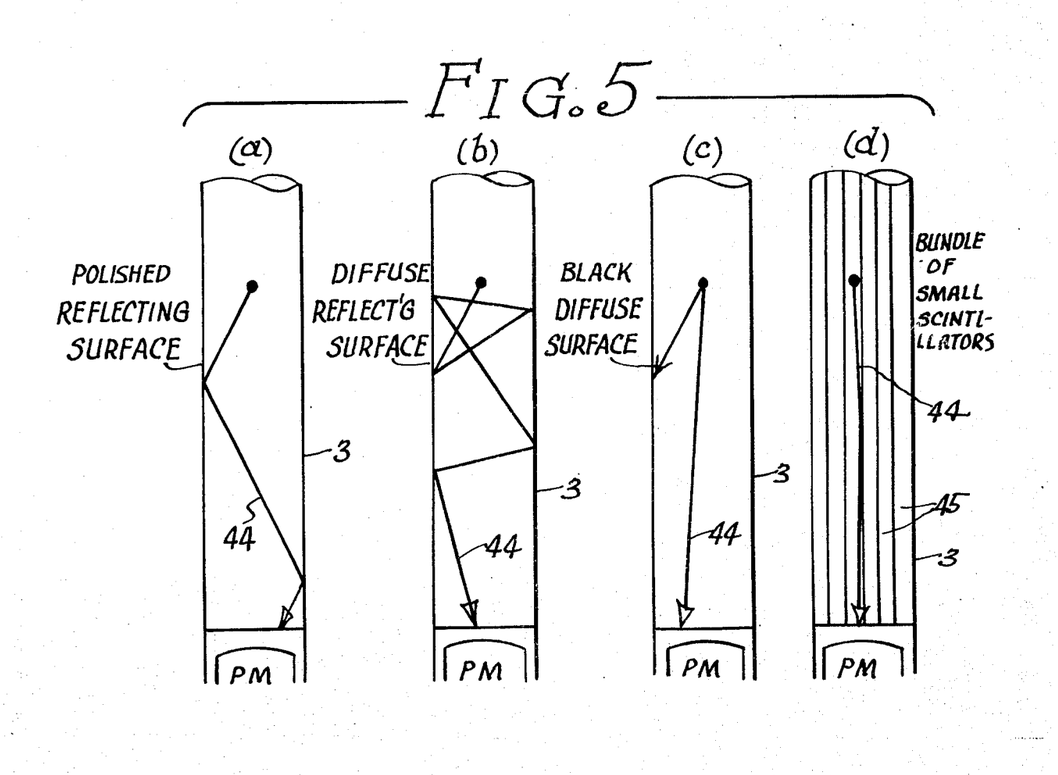
FIG. 5 is a schematic representation showing the effect of different light reflecting scintillator surfaces on the light paths within a cylindrical scintillator and the complexities of such paths.

Referring now to FIG. 5, the effect of different treatments of the cylindrical surface of the scintillator bar 3 of FIG. 1 is illustrated. This FIG. 5 also indicates the complex and random manner in which a scintillation photon is likely to travel along the bar, thus affecting the ultimate resolution.

FIG. 5(a) shows that specular reflection from a polished cylindrical surface yields good light output, but geometrically limits time resolution to simple path length differences.

The diffuse surface reflection illustrated in FIG. 5(b) yields the best light output and position resolution, depending upon the use of a pulse shaping amplifiers, such as the Ortec Model 454 Timing Filter Amplifier, between the photomultiplier anode outputs and the timing discriminators.

The diffuse reflection of FIG. 5(b), which we prefer, can be obtained by mechanically crazing the external surface of the scintillator bar as by roughening it with sandpaper, or by tightly wrapping the bar in a metal foil with the foggy (rougher) side in. This latter is the procedure we prefer at this time. In any event, all specular reflection cannot be eliminated with either of these treatments.

In FIG. 5(c) the absorption of all scatter light by a black diffuse crazed cylindrical surface minimizes path length differences but results in poor time resolution due to time jitter in the light limited photomultiplier anode pulses.

FIG. 5(d) illustrates a scintillation bar made from a bundle of thin parallel individual scintillation strands, each having its own polished reflecting surface so that it would act independently in regard to light photons born therein. The strands could have very small diameters of the order of a millimeter, for example. Such bundles should work well to maintain a high level of light output.

The invention as heretofore described, had been directed to a one dimensional subcombination of the three dimensional stationary positron camera of the present invention. The remaining Figs. are directed to the three dimensional positron camera, itself.

We have realized that any two finite skewed lines in space, that is, lines which neither intersect nor are parallel, are sufficient to define a unique tetrahedron;

that two scintillators bars, such as bar 3 of FIG. 1, may be arranged in a skewed fashion so as to form two skewed legs of such a tetrahedron; and that the substantially coincident times $(t_1)$, $(t_2)$, $(t_3)$ and $(t_4)$ at which photomultipliers at the four ends of the two scintillator bars are activated, although not known in an absolute sense, but only relatively, contain information sufficient to define the exact location within the tetrahedron of the positron annihilation producing the gamma rays causing the scintillation in each bar.

Figure 6:
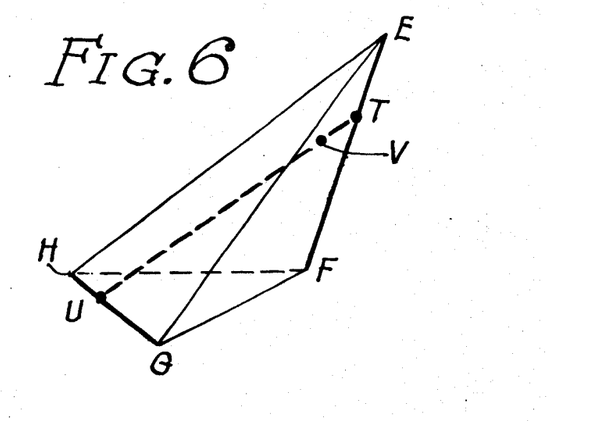
FIG. 6 is an isometric view of a tetrahedron useful in explaining the principles of the present invention.

Referring to FIG. 6, it can be seen that all tetrahedrons have four triangular sides and six legs. Each leg has one, and only one, other leg with which it has a skewed relationship. Thus, any particular tetrahedron has three skewed pairs of legs. The skewed pairs in FIG. 6 are HF and EG, HG and EF, and GF and HE. Any one of these three skewed pairs of legs may comprise a pair of scintillator bars, such as bar 3 of FIG. 1, and thus be used in forming the positron camera of our invention.

Figure 7:
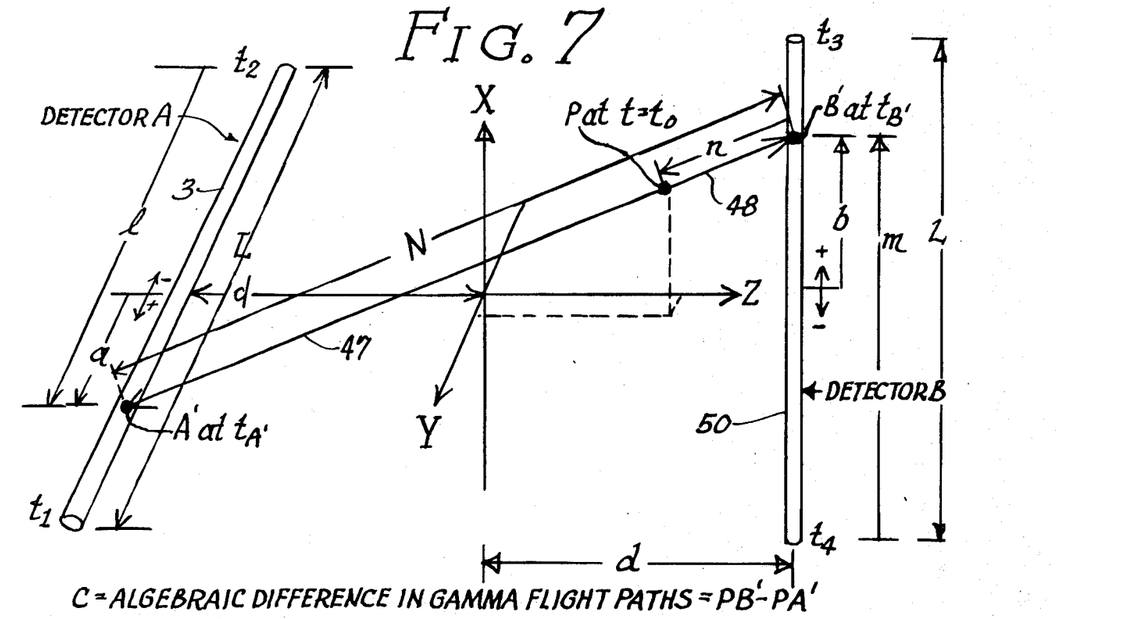
FIG. 7 is a schematic representation of the preferred spatial relationship of the scintillator pair employed in the three-dimensional camera of the present invention.

In FIG. 7 there is shown our preferred spatial arrangement of the pair of scintillator bars, and in FIG. 8, there is shown our preferred electronics circuitry for obtaining the positive output signal voltages $a''$, $b''$, $c''$, all of which have linear relationships with the coordinates $a$, $b$, $c$ in the unique $a$, $b$, $c$, coordinate system which we prefer to use, as will hereinafter be explained more fully.

Referring to FIG. 7, a standard right hand $x$, $y$, $z$, coordinate system is established for orientation and mathematical manipulation purposes, with the x and z dimensions being in the plane of the paper and the y dimension being normal thereto. Positive $x$, $y$, and $z$ directions are indicated by the arrows on the three lines forming the $x$, $y$, and $z$ coordinate system. The $z$ dimension normally represents the depth dimension in medical radiology.

Scintillator bar 3 is laid in the $x$, $y$, $z$ coordinate system such that it is parallel to the y direction and its midpoint is at $y=0$, $x=0$, and $z=-d$. The other scintillator bar 50 of the skewed pair is laid in the $x$, $y$, $z$ coordinate system such that it is parallel to the $x$ direction and its midpoint is at $x=0$, $y=0$, and $z=+d$. Thus, scintillator bars 3 and 50 are perpendicular to each other and do not intersect. They thus are skewed relative to one another and form two legs of and define a unique tetrahedron which constitutes the camera viewing volume. The two scintillator bars 3 and 50 are shown as having equal lengths (L), as this somewhat simplifies the analysis, although this is not at all a required condition of the invention. In a typical example (L) might be say 60 cm. and (d) 35 cms.

In the present case, we will assume a positron annihilation occurs at a point (P) at an arbitrary zero time $(t_o)$. There are a large number of positron emitting radiosotopes having different characteristics and advantages for particular problems arising in radiological medicine. Many of these have particularly small half-lives, making them especially useful for certain purposes. The smaller half-life also favors a stationary camera, such as that of the present invention, in order to avoid a time consuming scanning process. Upon emission in most environments, for example in a human patient, the positron has an average lifetime of only about a billionth of a second and a range of only about a millimeter or so. Accordingly, while our camera actually identifies the location of the positron annihilation event, for all practical purposes, it is identifying the location of the positron emitting radioactive nuclide. The point (P), as it is illustrated in FIG. 7, is within the tetrahedron defined by bars 3 and 50 and its approximate $x$, $y$, $z$ coordinates are $x=+15$ cm., $y=+4$ cm. and $z=+18$ cm.

The annihilization of the positron at point (P) produces two 511 keV gamma rays, as indicated by reference numerals 47 and 48, travelling at the speed of light, in directly opposite directions as required for the conservation of momentum. There is a large probability that both of these gamma rays will miss both scintillator bars 3 and 50. There is a smaller probability that one gamma ray will hit one bar and miss the other. There is still smaller probability that the two gamma rays will not only hit both bars 3 and 50 but will also interact with the material therein to produce a flash of visible light or scintillation. One of these latter least probable events is illustrated in FIG. 7 where the one gamma ray, indicated at 47, travels at the speed of light (30 nanoseconds / sec.) to scintillation bar 3 and produces a scintillation at point (A') at time $(t_A')$, and the other gamma ray indicated at 48 travels at the speed of light to scintillator bar 50 and produces a scintillation at point (B') at time $(t_B')$. As in the case of FIG. 1, the light photons from the scintillators at point (A') in bar 3 arrive at the left (lower) end of bar 3 at time $(t_1)$ and arrive at the right (upper) end of bar 3 at time $(t_2)$. Light photons from the scintillation at point (B') in bar 50 are shown as arriving at the upper end of the bar at time $(t_3)$ and arriving at the lower end of the bar at time $(t_4)$.

As in the case of FIG. 1, the scintillation point A' in bar 3 has the coordinate $(+a)$ from the midpoint of bar 3, and is a distance l from the right end of bar 3. Similarly, we establish a second coordinate (b) which we define as the distance from the midpoint of bar 50 of detector B to the scintillation point (B') in bar 50, the coordinate being positive under the exemplified circumstance where the scintillation is above the midpoint, and negative when the scintillation is below the midpoint. Similarly to FIG. 1, we also define an always positive distance (m) from the lower end of scintillator 50 to the scintillation point B' in bar 50, the equation for which is:

(6) $m = L/2 + b$

Figure 8:
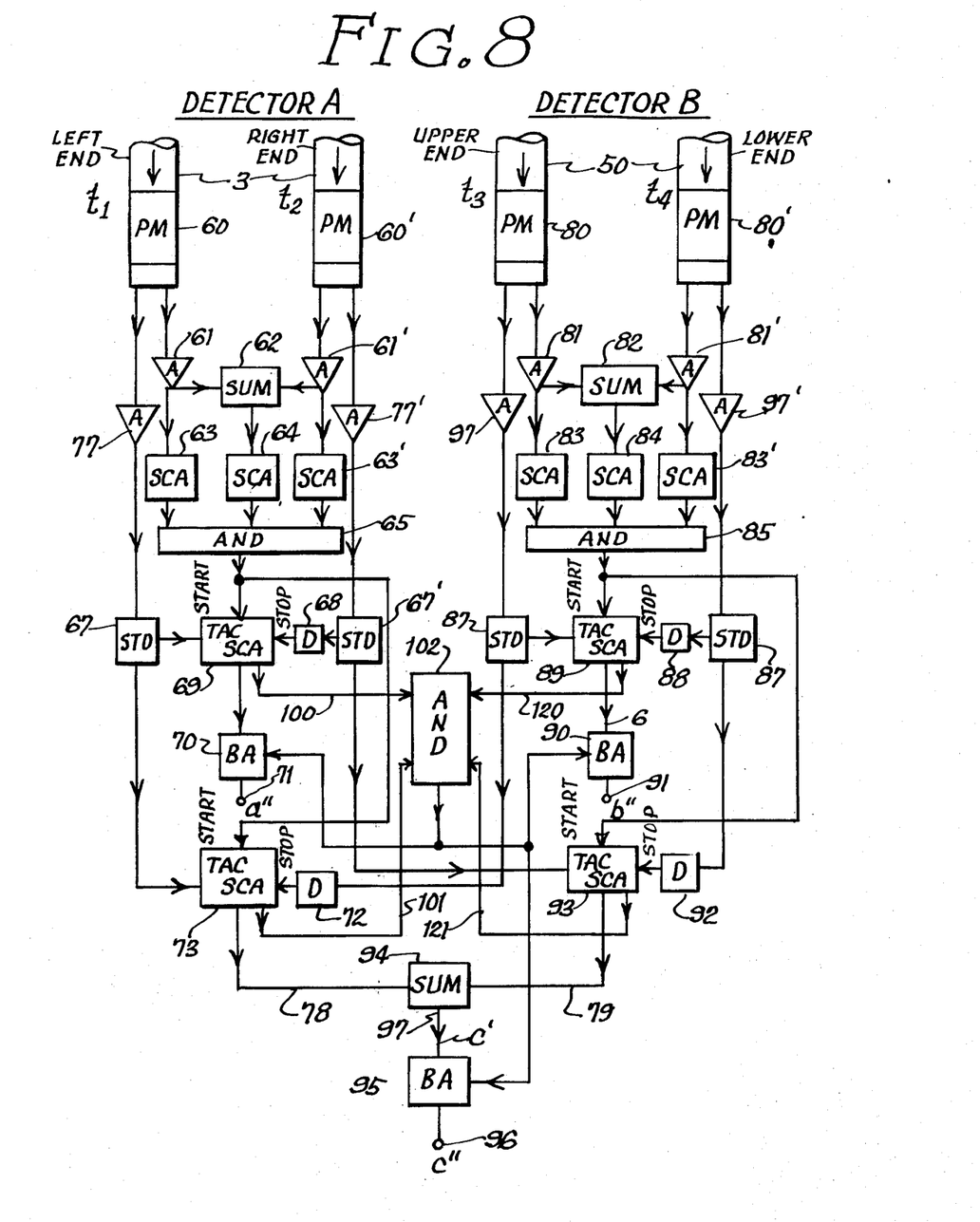
FIG. 8 is a block diagram of the preferred electronics of the three dimensional camera of the present invention.

Referring only to the fast electronic system of FIG. 8 for the present, scintillator bars 3 and 50 are preferably Nuclear Enterprises Pilot Division Model Pilot U bars. The photomultipliers 60, 60', preferably RCA Model 31024, disposed at opposing ends of scintillator bar 3, transmit timing output pulses from their respective anodes to the respective discriminators 67, 67', preferably Elscint Model STD-M-1 snap-off timing discriminators, by way of amplifiers 77, 77', preferably ORTEC Model 454. As in FIG. 1, the time delay circuit 68 delays the pulse from the right hand photomultiplier 60' by an appropriate delay time before it permits it to enter the time-to-amplitude converter 69 as the "stop" pulse therefore. The output timing pulse from the timing discriminator 67 goes directly to the time-to-amplitude converter 69 as the "start" pulse therefore. In the present case, the preferred time-to-amplitude converter is an ORTEC Model 467 which has a built-in single channel analyzer which interrogates the output signal, as will hereinafter be described.

It will be apparent that since detector A and its fast logic circuitry in FIGS. 7 and 8, as thus far described, are entirely comparable to those of FIG. 1, including the delay of specifically the ($t_2$) timing signal, equation (4) is still applicable for the output signal ($a'$) from the time-to-amplitude converter 69.

FIG. 8 also differs from FIG. 1 in having a biased amplifier 70 which receives the output pulse ($a'$) from the time-to-amplitude converter 69, and amplifies that portion of its input voltage pulse which exceeds the bias voltage at which it has been set, and produces the resulting output signal ($a''$) at output terminal 71. The biased amplifier 70 is preferably an ORTEC Model No. 444.

Referring back to FIG. 2, the effect of the biased amplifier is to provide an upwardly revised zero voltage reference line and then to amplify the entire signal above the revised zero reference line, in effect, providing a time spectrum expansion in the output signal ($a''$) such that its information containing portion is a greater fraction of the entire signal than was the case for the output signal ($a'$) of FIG. 1. The amplification effect is not shown in FIG. 2.

Substituting for $a'$ from Equation (4), we can then state:

$$(7)\ a'' = k_{10}(a' - s) = k_{10}(k_7 + k_8 a - s) = k_{11} + k_{12}a.$$

There is thus established a linear relationship between the amplitude ($a''$) of the output pulse at terminal 71 and the coordinate ($a$), wherein the first term $k_{11}$ is a positive constant and the second term ($k_{12}a$) is a variable, and positive or negative corresponding to whether ($t_2 - t_1$) is positive or negative, and the first term ($k_{11}$) is necessarily greater in magnitude than the second term ($k_{12}a$) so that the value ($a''$) is necessarily positive. Since the constants $k_{11}$ and $k_{12}$ are either known or readily obtainable either by calculation or calibration, and the actual amplitude of the voltage ($a''$) can be measured, the value and sign of the coordinate ($a$) in FIG. 7 could be actually obtained by pencil and paper calculations, if desired, thus locating the point ($A'$) on the bar 3.

Similarly, we can obtain the equation relating the output signal ($a''$) to the dimension $l$ by substituting in Equation (7) the value of $a = l - L/2$ from Equation (2):

$$(8)\ a'' = k_{11} + k_{12}(l - L/2) = k_{11} - k_{12}L/2 + k_{12}l = k_{33} + k_{11}l,$$

wherein all terms are positive quantities.

Similarly, considering detector B and its fast electronic circuitry, it is apparent that everything is exactly the same as for detector A and its fast electronic circuitry, with ($t_4$) timing signal being employed as the "stop" signal after being appropriately delayed, (thus being comparable to ($t_2$) ) and the ($t_3$) timing signal being employed as the "start" signal (thus being comparable to ($t_1$) ). Electronic circuitry and modules associated with detector B are given reference numerals in FIG. 8 higher by twenty than the corresponding electronic circuitry and modules associated with detector A. Therefore, we can express the amplitude of output ($b''$) of biased amplifier 90 at terminal 91 by the following equation:

$$(9)\ b'' = k_{13} + k_{14} b,$$

comparable to Equation (7) for the voltage signal $a''$.

Similarly, we can obtain the actual value of $m$, if we wish, by substituting the value $b = m - L/2$ (from Equation (6) ) in Equation (9).

$$(10)\ b'' = k_{13} + k_{14}(m - L/2) = k_{13} - k_{14}L/2 + k_{14}m$$
$$= k_{15} + k_{14}m$$

wherein all terms are necessarily positive quantities.

It is apparent therefore that the output ($a''$) at terminal 71 contains sufficient information to specify the coordinate ($a$), and the output ($b''$) at terminal 91 contains sufficient information to specify the coordinate ($b$). The The coordinates ($a$) and ($b$) are sufficient, in turn, to define a unique line between them, i.e. the line of flight of the two gamma rays 47 and 48, as well as the length (N) of such line:

$$N = \sqrt{a^2 + b^2 + 4d^2}$$

We also define a third coordinate ($c$) of the a,b,c, coordinate system we have chosen to use as the algebraic difference in the two flight path lengths, i.e. ($c$) = PB' − PA'. It is apparent that this coordinate ($c$) will be positive or negative depending upon whether the annihilation point is closer along the flight path to scintillator bar 3 or scintillator bar 50, respectively. In the illustrated circumstance, PA' is longer than PB' and therefore c is negative. If PA' and PB' were equal, c would be zero and point (P) would be at the midpoint of line A'B'. If point (P) were at point (A'), (c) would equal (+N) and if point P were at point (B'), c would equal −N.

Since both gamma rays 47 and 48 travel at the speed of light, 30 namoseconds per second, there is a proportionality we can state:

$$(11)\ c = PB' - PA' = 30\ (t_{B'} - t_{A'})$$

We cannot measure $t_{A'}$ or $t_{B'}$ or their difference directly, but we can obtain a measure of ($t_{B'} - t_{A'}$) through the time relationship of $t_1$, $t_2$, $t_3$ and $t_4$.

The time ($t_1$) is the time required for the gamma ray 47 to travel from point (P) to point (A') plus the time required for the visible light from the scintillation to travel from (A') to the left end of the bar 3. Similarly, the time ($t_2$) is the time required for the gamma ray 47 to travel from point (P) to point (A') plus the time required for the visible light to travel from A' to the right end of bar 3. We can therefore state:

$$(12)\ t_1 + t_2 = 2\ PA'/30 + k_{20},$$

wherein $k_{20}$ is the time required for visible light to traverse the entire length (L) of the bar.

Similarly, we can state:

$$(13)\ t_3 + t_4 = 2\ PB'/30 + k_{20}$$

Subtracting Equation (12) from Equation (13) we obtain:

$$(14)\ (t_3 + t_4) - (t_1 + t_2) = PB' - PA'/15$$

Equation (14) can be stated as:

$$(15)\ 15((t_3 - t_1) + (t_4 - t_2)) = P_{B'} - P_{A'} = c$$

Returning now to a consideration of the fast electronic circuitry of FIG. 8, the timing pulse from the timing discriminator 67 is also fed to the time-to-amplitude converter 73 as its "start" pulse, and the timing pulse from the timing discriminator 87 is first delayed by an interval of time ($k_{21}$) by time delay line 72, and is then fed to the time-to-amplitude converter 73 as its "stop" pulse. Here again the delay ($k_{21}$) introduced must be at least as great as the maximum possible value of ($t_3 - t_1$) so that the entire term ($t_3 - t_1 + k_{21}$) is positive, and in practice, the delay $k_{21}$ is substantially more than that, as previously explained. The amplitude ($A_{78}$) of the output pulse of line 78 can then be expressed as:

(16) $A_{78} + k_{22}((t_3 - t_1) + k_{21})$

In an entirely similar manner, the amplitude ($A_{79}$) of the output pulse on line 79 can be expressed as:

(17) $A_{79} = k_{22}((t_4 - t_2) + k_{21})$, assuming the delays introduced by delay lines 72 and 92 are identical ($k_{21}$) and the proportionality constant, of time-to-amplitude converters 73 and 93 are identical ($k_{22}$).

The amplitude (C') of the summing circuit of the summing circuit 94 to which lines 78 and 79 are fed can then be expressed as:

(18) $c' + A_{78} + A_{79} = k_{22}((t_3 - t_1) + k_{26}$

Combining with Equation (15), we obtain:

(19) $c' = k_{27}c + k_{28}$, and then taking into the account the previously described effect of biased amplifier 95, the output ($c''$) on output terminal 96 can be expressed:

(20) $c'' = k_{29}c + k_{30}$, wherein, as in the case of ($a''$) and $b''$), the first term ($k_{29}c$) can be positive or negative, but in any event, is lesser in magnitude than the second term ($k_{30}$) so that the value of ($c''$) itself, is always positive.

As always positive distance ($n$) is also established as shown in FIG. 7 as the distance from the point (B') to point (P) along the gamma flight path. Its magnitude is, of course, equal to PB' and its algebraic relationship to the coordinate ($c$) is given by the equation:

In a similar procedure as before, the relationship between the output voltage signal $c''$ and the dimension ($n$) can be obtained by substituting the value $c = 2n - N$ from Equation (21) in Equation (20) as follows:

(22) $c'' = k_{29}(2n - N) + k_{30} = k_{31} n + k_{32}$, wherein all terms are positive. (We are here treating N as a constant).

The fast electronics system of FIG. 8 thus has three always positive voltage output signals $a''$, $b''$ and $c''$, each of which has a linear relationship with the coordinates $a$, $b$, $c$, and from which the actual values of the coordinates $a$, $b$, $c$, can be obtained, if desired, by calculation or calibration. The coordinates $a$, $b$, $c$ define the point P in space, given a particular spatial arrangement for the two skewed scintillator bars. The coordinates $a$, $b$, $c$ may be positive or negative. We have also defined three always positive distances, which we may think of as coordinates if we like, $l$, $m$, and $n$, which also have a linear relationship with the always positive voltage output signals $a''$, $b''$, and $c''$ which would also serve to define the point (P).

Referring to the "slow" circuitry of FIG. 8, a positive dynode signal from photomultiplier 60, having an amplitude proportional to the light received by the photomultiplier, is amplified in amplifier 61 and the amplified output signal is transmitted to a summing circuit 62 and also to a conventional single channel analyzer 63. Similarly, a positive dynode signal from photomultiplier 60' is amplified in amplifier 61 and the amplified output signal is transmitted both to the summing circuit 62 and to a single channel analyzer 63'. The summed signal is transmitted to single channel analyzer 64.

Single channel analyzers 63, 63' would preferably be set to pass pulses corresponding to a range of about 50 to 600 keV, thus eliminating noise pulses and other pulses obviously not derived from a 511 KeV scintillation. The single channel amplifier 64 would perhaps be considered the most critical one, and it would preferably be set to pass pulses corresponding to an energy range of about 400 to 600 keV. (If none of the 511 keV energy from the scintillation were absorbed or otherwise lost, and all of it were collected by photomultiplier tube 1 or photomultiplier tube 2, then the voltage signal input to single channel analyzer 64 would correspond to exactly 511 keV.)

If the three input pulses are all passed by the three single channel analyzers 63, 63' and 64, they are transmitted to a three-way "AND" circuit 65, which upon receipt of all three signals, sends a standard enabling signal to the time-to-amplitude converter 69 and also to the time-to-amplitude converter 73. The corresponding elements of the slow circuitry associated with detector B operate in exactly the same manner to enable time-to-amplitude converters 89 and 93, the corresponding elements having reference numerals higher by twenty, as previously indicated.

It was previously stated that the four time-to-amplitude converters 69, 89, 73 and 93 are preferably the ORTEC Model 467. These model time-to-amplitude converters have built-in single channel analyzers, indicated in each case by the "SCA" legend near the bottom right in the block designating the converter. The single channel analyzer interrogates the output pulse from the time-to-amplitude converter to check that it lies in an acceptable voltage band or window for which the converter has been set. In each case, the window is set such that its intermediate value corresponds to the delay introduced by the associated delay line, and the width of the window is set somewhat wider than the maximum possible voltage differences attributable to different scintillation points in bars 3 and 50, as to time-to-amplitude converters 69 and 89, respectively, or attributable to different annihilation points within the tetrahedron as to time-to-amplitude converters 73 and 93. Referring again to FIG. 2, ($k_7$) could be thought of as representing the intermediate value of the window for time-to-amplitude converter 69 and ($2k_8L/2$) could be thought of as representing the minimum width of the window.

If the output pulse of each of the four time-to-amplitude converters 69, 89, 73 and 93 all have amplitudes within the corresponding possible coincidence window, affirming logic pulses are transmitted, by way of lines 100, 120, 101 and 121, respectively, to a four way AND circuit 102, which circuit upon receipt of all four affirming logic signals, sends a standard enabling pulse signal to the three biased amplifiers 70, 90 and 95.

It will be apparent that the logic and coincidence circuitry of FIG. 8 could be arranged in many ways other than that described to accomplish the intended purpose. The only absolute requirement is that the logic apparatus have fed into it for processing timing pulses corresponding to $(t_1)$, $(t_2)$, $(t_3)$, and $(t_4)$ since such timing pulses contain all the information needed to locate the annihilation in space, given a particular pair of skewed detectors, and a given geometry thereof. If we wished for some reason, we could simply record the four relative values for later playback and analysis.

The manner in which the output signals $a''$, $b''$ and $c''$ which, of course, contain within themselves the necessary information as to the coordinates $a$, $b$, and $c$, are employed, depends upon the desires and purposes of the individual user and the equipment available to him. They could be recorded serially on three separate $a''$, $b''$ and $c''$ tracks of a record tape, for example, for later playback and analysis. Whatever the use or the equipment, it would be desirable to transform the $a$, $b$, $c$ coordinates to the usual $x$, $Y$, $z$ coordinates which are easier to visualize and manipulate.

Mathematically, each $a$, $b$, $c$ triplet could be transformed to the corresponding $x$, $Y$, $z$ triplet for the camera of FIG. 7 by the following transformation.

(23) $x = b/2 (1 - c/N)$ (24) $y = a/2 (1 + c/N)$ (25) $z = - dc/N$

It should be emphasized that the above transformation applies only to the particular camera of FIG. 7 and its particular orientation relative to the $x$, $y$, $z$ coordinate system. The transformations applicable to other camera geometries and other $x$, $y$, $z$ points of origin could be worked out by analytical geometry.

If desired the $a''$, $b''$, $c''$ triplets, all being positive, could be digitized and stored in a memory core, either before or after transformation to corresponding $x$, $y$, $z$ triplets. If this were to be done, a Digital Equipment Company Model 11/40 computer and Digital Equipment Company Gamma 11 software could well be used. The diagnostician would probably first present on an oscilloscope a three dimensional isometric display, with count density coded by grey scale intensity. A two dimensional presentation of successive slices of the image, with slice widths selected by the diagnostician, would then be used to observe its totally isolated laminar sections.

In the camera of FIG. 7 the lengths (L) of the two scintillation bars are equal, the two scintillation bars are normal to each other, and a line drawn through the midpoint of both bars is also normal to both bars. While such is our preferred arrangement, it should be emphasized that none of these conditions is necessary. The principles of the invention could be applied to any two finite skewed lines forming a unique tetrahedron within the volume of which the camera would pick up and identify the location of positron annihilations.

As just one example of this, the heavier lines HG and EF of FIG. 6 could be chosen as legs to constituting the pair of skewed scintillator bars. According to the principles of the invention, a scintillation point T could be located on line EF and a substantially coincident scintillation point U could be located on the line HG, and finally the substantially coincident positron annihilation event V could be located on the line joining points U and T.

The sensitivity of the camera could be increased by employing a plurality of pairs of skewed scintillation bars, each pair defining the same or nearly the same tetrahedron or effective camera sensitive volume. Referring again to FIG. 6, the other two pairs of skewed legs, pair HF and EG, and pair GF and EH, could also constitute scintillator bars. Each bar of the pair would have its own pair of photomultipliers and its own complete electronic circuitry such as is shown in FIG. 8, including its own sets of triplets $a''$, $b''$, $c''$ and $a$, $b$, $c$. Transformation to a common $x$, $y$, $z$ coordinate system could readily be effected. We would thus be increasing the sensitivity only three-fold and the camera itself would be awkward in use since each of its four legs would constitute a scintillation bar.

Figure 9:
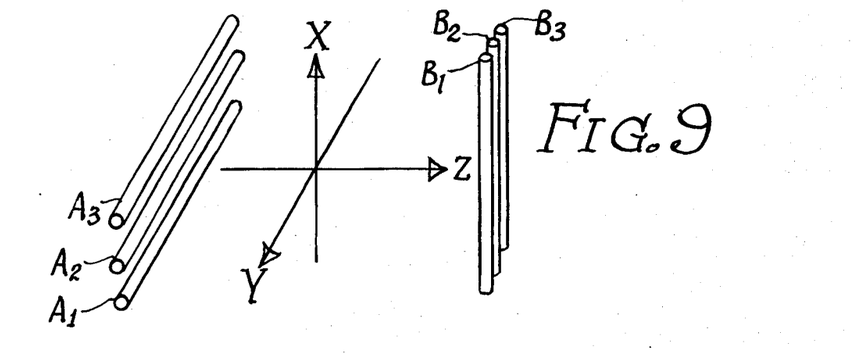
FIG. 9 is a schematic representation of one way in which the invention can be used in any number of closely adjacent multiples each representing overlapping tetrahedrons and increasing the counting efficiency by the square of the multiple used.

Our preferred means for increasing sensitivity of our camera is shown in FIG. 9 wherein, in general, the geometry and orientation relative to an $x$, $y$, $z$ coordinate system are the same as for FIG. 7 in FIG. 9, in addition to detector $A_2$ which can be considered as corresponding to bar 3 of FIG. 7, detectors $A_1$ and $A_3$, identical to detector $A_2$, are disposed on both sides of and parallel to detector $A_2$, all three being very closely spaced from one another along the x direction. Similarly, in addition to detector $B_2$ which can be considered to correspond to bar 50 of FIG. 7, detectors $B_1$ and $B_3$, identical to detector $B_2$, are disposed on both sides of and parallel to detector B, all three being very closely spaced from one another in the y direction. The plurality of parallel detectors could actually be contiguous if desired.

Since each of detectors $A_1$, $A_2$, and $A_3$ forms a unique tetrahedron with each of detectors $B_1$, $B_2$, and $B_3$, nine closely overlapping tetrahedrons are defined. As many pairs of detectors as are desired may be employed, the number of unique overlapping tetrahedrons defined being the square of the number of pairs of detectors used. The closer the spacing between the parallel detectors the greater the overlap between the tetrahedrons and the larger the camera volume to which all detectors are sensitive. Each detector pair could have its own complete electronic circuitry such as shown in FIG. 8, and each would have its own slightly different sets of triplets $a''$, $b''$, $c''$ and $a$, $b$, $c$, which would have to be kept separate. However, by judicious use of conventional multiplexing techniques the more expensive modules of FIG. 8, namely the four time-to-amplitude converters could be shared by all detector pairs. Here again, the $a$, $b$, $c$, coordinates could be transformed into the more useful coordinates of a single $x$, $y$, $z$ coordinate system common to all the overlapping tetrahedrons. The mathematical transformations would, however, be slightly different for each tetrahedron.

We claim:

1. In a positron radionuclide camera system, in combination, a pair of elongated plastic scintillator bars having a skewed spatial relationship to each other, the axes of said pair of bars thereby defining a unique tetrahedron in space constituting the camera sensitive volume, each of said bars having disposed at each end thereof light responsive means for producing respective timing pulses at times $(t_1)$, $(t_2)$, $(t_3)$, and $(t_4)$ subsequent to the occurrences within said tetrahedron of certain positron annihilations.

2. Apparatus, as claimed in claim 1, wherein the bars are normal to each other and to a line joining the midpoint of each bar.

3. Apparatus, as claimed in claim 1, further including signal processing means for producing an output signal voltage having a linear relationship with the quantity $((t_3 + t_4) - (t_1 + t_2))$.

4. Apparatus, as claimed in claim 3, wherein said signal processing means comprises means for delaying the $(t_3)$ timing pulse by an interval of time greater than the maximum possible magnitude of the quantity $(t_1 - t_3)$ irrespective of the location of the positron annihilization in the tetrahedron, a time-to-amplitude converter receiving the undelayed timing pulse $(t_1)$ as its "start" signal and the delayed timing pulse $(t_3)$ as its "stop" signal, means for delaying the $(t_4)$ timing pulse by an interval of time greater than the maximum possible magnitude of the quantity $(t_2 - t_4)$ irrespective of the location of the positron annihilization in the tetrahedron, a time-to-amplitude converter receiving the undelayed timing pulse $(t_2)$ as its "start" signal and the delayed timing pulse $(t_4)$ as its "stop" signal, and means for summing the amplitudes of the output signal pulses from the two time-to-amplitude converters.

5. In a positron radionuclide camera system, in combination, a plurality (N) of pairs of elongated plastic scintillator bars, the bars of each pair having a skewed spatial relationship to each other and to one bar of each of the other pairs, the axes of the bars thereby defining ($N^2$) unique tetrahedrons in space constituting camera sensitive volume, each of said bars having disposed at each end thereof light responsive means for producing ($N^2$) respective sets of timing pulses at times $(t_1)$, $(t_2)$, $(t_3)$, and $(t_4)$ subsequent to the occurrences within said tetrahedron of certain positron annihilations, the times $(t_1)$, $(t_2)$, $(t_3)$ and $(t_4)$ being different in each set of timing pulses.

6. Apparatus, as claimed in claim 5, wherein one of the bars of each pair is parallel and closely adjacent all of its associated bars of the other pairs, and the other bar of each pair is also parallel and closely adjacent all of its associated bars of the other pairs, whereby the ($N^2$) unique tetrahedrons are largely overlapping.

7. In a radionuclide camera system, in combination, an elongated plastic scintillator bar, a first light responsive means disposed at one end of said bar for producing an output timing pulse at a time $(t_1)$ subsequent to the time of occurrence of a scintillator event within said tube, a second light responsive means disposed at the other end of said bar for producing an output timing pulse at a time $(t_2)$ subsequent to the time of occurrence of said scintillator event, means for delaying one of said timing pulses by an interval of time (D) greater than the amount of time which would be required for scintillation light photons to traverse the entire length of said bar, a time-to-amplitude converter adapted to produce an output voltage pulse having an amplitude proportional to the time interval between its "start" pulse and its subsequent "stop" pulse, means for connecting the delayed timing pulse to the time-to-amplitude converter as its "stop" pulse, and means for connecting the undelayed timing pulse to the time-to-amplitude converter as its "start" pulse.

8. Apparatus, as claimed in claim 7, wherein said scintillator bar has a polished surface to maximize internal specular reflection of light photons.

9. Apparatus, as claimed in claim 7, wherein the outer surface of said scintillator bar has been roughened to maximize internal diffuse reflection of light photons.

10. Apparatus, as claimed in claim 7, wherein the outer surface of said scintillator bar has been blackened to maximize internal absorption of light photons.

11. Apparatus, as claimed in claim 7, wherein the scintillator bar comprises a plurality of parallel scintillator bars of lesser diameter.

12. Apparatus, as claimed in claim 7, wherein the scintillator bar comprises a plurality of parallel filamentary scintillator strands.

13. Apparatus, as claimed in claim 7, further including a first timing discriminator disposed between the output of one of said light responsive means and the "start" terminal of said time-to-amplitude converter and a second timing discriminator disposed between the output of the other of said light responsive means and the input of said delaying means, both of said discriminator means including means for setting a minimum threshold value for its input pulse.

14. Apparatus, as claimed in claim 7, further including a biased amplifier connected to the output of said time-to-amplitude converter for amplifying that portion of the time-to-amplitude converter output which exceeds the bias value for which the biased amplifier has been set.

15. In a radionuclide camera system, in combination, an elongated plastic scintillator bar, a first photomultiplier tube disposed at one end of said bar for producing an anode output timing pulse at a time $(t_1)$ subsequent to the time of occurrence of a scintillator event within said tube, a second photomultiplier tube disposed at the other end of said bar for producing an anode output timing pulse at a time $(t_2)$ subsequent to the time of occurrence of said scintillator event, means for delaying one of said timing pulses by an interval of time (D) greater than the amount of time which would be required for scintillation light photons to traverse the entire length of said bar, a time-to-amplitude converter adapted to produce an output voltage pulse having an amplitude proportional to the time interval between its "start" pulse and its subsequent "stop" pulse, means for connecting the delayed timing pulse to the time-to-amplitude converter as its "stop" pulse, means for connecting the undelayed timing pulse to the time-to-amplitude converter as its "start" pulse, said time-to-amplitude converter including an enabling input terminal, means for deriving a dynode output pulse from one of said photomultipliers, means for deriving a dynode output pulse from the other of said photomultipliers, summing means for receiving said two dynode output pulses and producing an output pulse having an amplitude equal to the sum of the inputs, a first single channel analyzer means connected to receive the output of said summing means and adapted to generate and pass a standard logic pulse only in the event the amplitude of its received input lies in an appropriate range for which said anlayzer has been set, and means for connecting the output terminal of said analyzer to the enabling terminal of said converter.

16. In a radionuclide camera system, in combination, an elongated plastic scintillator bar, a first photomultiplier tube disposed at one end of said bar for producing an anode output timing pulse at a time ($t_1$) subsequent to the time of occurrence of a scintillator event within said tube, a second photomultiplier tube disposed at the other end of said bar for producing an anode output timing pulse at a time ($t_2$) subsequent to the time of occurrence of said scintillator event, means for delaying one of said timing pulses by an interval of time (D) greater than the amount of time which would be required for scintillation light photons to traverse the entire length of said bar, a time-to-amplitude converter adapted to produce an output voltage pulse having an amplitude proportional to the time interval between its "start" pulse and its subsequent "stop" pulse, means for connecting the delayed timing pulse to the time-to-amplitude converter as its "stop" pulse, means for connecting the undelayed timing pulse to the time-to-amplitude converter as its "start" pulse, said time-to-amplitude converter including an enabling input terminal, means for deriving a dynode output pulse from one of said photomultipliers, means for deriving a dynode output pulse from the other of said photomultipliers, summing means for receiving said two dynode output pulses and producing an output pulse having an amplitude equal to the sum of the inputs, a first single channel analyzer means connected to receive the output of said summing means and adapted to generate and pass a standard logic pulse only in the event the amplitude of its received input lies in an appropriate range for which said analyzer has been set, a second and a third single channel analyzer means respectively connected to receive dynode output pulses from said respective photomultipliers and to generate and pass respective standard logic pulses only in the event the respective amplitudes of their received inputs lie in the respective appropriate ranges for which said second and third analyzers have been set, an AND circuit, means connecting the three respective logic outputs from said three analyzers to said AND circuit, and means connecting the output pulse from said AND circuit to the enabling terminal of said converter.

17. In a radionuclide camera system, in combination, an elongated plastic scintillator bar, a first light responsive means disposed at one end of said bar for producing an output timing pulse at a time ($t_1$) subsequent to the time of occurrence of a scintillator event within said tube, a second light responsive means disposed at the other end of said bar for producing an output timing pulse at a time ($t_2$) subsequent to the time of occurrence of said scintillator event, and signal processing means responsive to said output timing pulses for producing an output voltage signal having a linear relationship with the quantity ($t_2 - t_1$).

* * * * *

UNITED STATES PATENT OFFICE
CERTIFICATE OF CORRECTION

Patent No. 3,978,337  Dated August 31, 1976

Inventor(s) Nickles and Meyer   Page 1 of 3

It is certified that error appears in the above-identified patent and that said Letters Patent are hereby corrected as shown below:

Column 3, line 67, insert "pulse" after "timing".

Column 5, line 23, delete "resolution." and insert "and".

Column 5, line 24, delete "resolutions" and insert "resolution".

Column 5, line 52, delete "(1)" and insert "($\ell$)".

Column 5, Equation (2), delete "1" and insert "$\ell$".

Column 5, line 61, delete "(1)" and insert "($\ell$)".

Column 6, line 4, delete "(1)" and insert "($\ell$)".

Column 6, line 5, after "would be" delete "1=L; 1=L/2; and 1=0" and insert "$\ell$=L; $\ell$=L/2; and $\ell$=0".

Column 6, line 39, delete "(1)" and insert "($\ell$)".

Column 6, line 66, delete "zero 1" and insert "zero $\ell$"; and after "distance" delete "(1)" and insert "($\ell$)".

Column 6, line 67, delete "($k_8$1)" and insert "($k_8\ell$)".

Column 6, line 68, delete "zero 1" and insert "zero $\ell$".

Column 7, line 3, delete "zero 1" and insert "zero $\ell$".

Column 7, line 4, delete "(1)" and insert "($\ell$)".

Column 7, line 6, delete "a=1-L/2" and insert "a=$\ell$-L/2".

UNITED STATES PATENT OFFICE
CERTIFICATE OF CORRECTION

Patent No. 3,978,337          Dated August 31, 1976

Inventor(s) Nickles and Meyer          Page 2 of 3

It is certified that error appears in the above-identified patent and that said Letters Patent are hereby corrected as shown below:

Column 7, delete Equation 5 and insert the following:
"$a' = k_7 + k_8 (\ell - L/2) = k_7 - k_8 L/2 + k_8 \ell = k_9 + k_8 \ell$".

Column 7, line 12, after "zero" delete "1" and insert "$\ell$".

Column 10, line 35, after "distance" delete "1" and insert "$\ell$".

Column 11, line 45, after "dimension" delete "1" and insert "$\ell$".

Column 11, line 46, after "the value of" delete "a=1-L/2" and insert "$a = \ell - L/2$".

Column 11, delete Equation 8 and insert the following:
"$a'' = k_{11} + k_{12}(\ell - L/2) = k_{11} - k_{12} L/2 = k_{11}\ell = k_{33} + k_{11}\ell$".

Column 12, Equation 14, delete "PB'-PA'/15" and insert "$\dfrac{PB' - PA'}{15}$".

UNITED STATES PATENT OFFICE
CERTIFICATE OF CORRECTION

Patent No. 3,978,337      Dated August 31, 1976

Inventor(s) Nickles and Meyer      Page 3 of 3

It is certified that error appears in the above-identified patent and that said Letters Patent are hereby corrected as shown below:

Column 15, line 23, delete "x,Y,z" and insert "x,y,z".

Column 15, line 26, delete "x,Y,z" and insert "x,y,z".

Column 16, line 24, delete "Fig. 7 in" and insert "Fig. 7 In".

Signed and Sealed this

Tenth Day of May 1977

[SEAL]

Attest:

RUTH C. MASON
*Attesting Officer*

C. MARSHALL DANN
*Commissioner of Patents and Trademarks*